United States Patent
Sampei et al.

(10) Patent No.: US 9,793,761 B2
(45) Date of Patent: Oct. 17, 2017

(54) WIRELESS POWER TRANSMISSION SYSTEM

(71) Applicant: ALPS ELECTRIC CO., LTD., Ota-ku, Tokyo (JP)

(72) Inventors: Takeshi Sampei, Tokyo (JP); Masashi Tabata, Tokyo (JP); Masaki Yamamoto, Tokyo (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 471 days.

(21) Appl. No.: 14/585,471

(22) Filed: Dec. 30, 2014

(65) Prior Publication Data

US 2015/0222148 A1 Aug. 6, 2015

(30) Foreign Application Priority Data

Jan. 31, 2014 (JP) ................ 2014-016541

(51) Int. Cl.
- H02J 17/00 (2006.01)
- H01F 38/14 (2006.01)
- H02J 5/00 (2016.01)
- H01F 27/36 (2006.01)

(52) U.S. Cl.
CPC ............ *H02J 17/00* (2013.01); *H01F 27/365* (2013.01); *H01F 38/14* (2013.01); *H02J 5/005* (2013.01)

(58) Field of Classification Search
CPC ......... H02J 17/00; H02J 5/005; H01F 27/365; H01F 38/14
USPC ...................................................... 307/104
See application file for complete search history.

(56) References Cited

U.S. PATENT DOCUMENTS

| | | | |
|---|---|---|---|
| 2011/0169338 A1* | 7/2011 | Kozakai | H02J 5/005 307/104 |
| 2012/0032521 A1* | 2/2012 | Inoue | B60L 11/123 307/104 |
| 2013/0119776 A1* | 5/2013 | Kamata | H02J 7/025 307/104 |
| 2014/0111153 A1* | 4/2014 | Kwon | H02J 7/025 320/108 |
| 2014/0266037 A1* | 9/2014 | Akiyoshi | H02J 7/025 320/108 |

(Continued)

FOREIGN PATENT DOCUMENTS

JP 2002-101578 1/2002

*Primary Examiner* — Brandon S Cole
(74) *Attorney, Agent, or Firm* — Hunton & Williams LLP

(57) ABSTRACT

A wireless power transmission system for wirelessly transmitting electric power from a power transmitting device to a power receiving device using magnetic field coupling between a power transmitting coil and a power receiving coil is provided. The power transmitting device includes a power transmitting circuit generating an electric signal for transmitting electric power, first and second power transmitting coils compatible with first and second transmission methods, respectively, a first magnetic substance on which the first power transmitting coil is placed, a second magnetic substance on which the second power transmitting coil is placed, and a power feeding surface on which the power receiving device is to be placed. First and second attachment surfaces of the first and second magnetic substances, respectively, are located on the lower side of the power feeding surface and arranged on a same plane surface parallel to the power feeding surface.

5 Claims, 10 Drawing Sheets

(56) References Cited

U.S. PATENT DOCUMENTS

| | | | | |
|---|---|---|---|---|
| 2014/0312709 A1* | 10/2014 | Nakano | .................. | H02J 5/005 307/104 |
| 2014/0333148 A1* | 11/2014 | Uchida | .................. | H02J 5/005 307/104 |
| 2015/0165923 A1* | 6/2015 | Hirayama | ............... | H02J 5/005 455/90.1 |
| 2016/0141882 A1* | 5/2016 | Ichikawa | ................ | H02J 17/00 307/104 |

* cited by examiner

WIRELESS POWER TRANSMISSION SYSTEM

CLAIM OF PRIORITY

This application contains subject matter related to and claims the benefit of Japanese Patent Application No. 2014-016541 filed on Jan. 31, 2014, the entire contents of which is incorporated herein by reference.

BACKGROUND OF THE DISCLOSURE

1. Field of the Disclosure

Embodiments of the present disclosure relate to a wireless power transmission system, and in particular, relates to a wireless power transmission system compatible with a plurality of transmission methods.

2. Description of the Related Art

In recent years, a wireless power transmission system that wirelessly transmits electric power from a power transmitting device to a power receiving device using magnetic field coupling between a power transmitting coil and a power receiving coil has been put to practical use.

As the transmission method for electric power (hereinafter, abbreviated as a transmission method), which utilizes the magnetic field coupling, an electromagnetic induction method in which the power transmitting coil and the power receiving coil are situated close to each other and electric power is transmitted from the power transmitting device to the power receiving device using electromagnetic induction between the power transmitting coil and the power receiving coil, a magnetic resonance method in which electric power can be transmitted from the power transmitting device to the power receiving device using magnetic resonance between the power transmitting coil and the power receiving coil even if the power transmitting coil and the power receiving coil are separated from each other by a distance, or the like is used.

As a device relating to a wireless power transmission system of the related art based on the electromagnetic induction method, such a non-contact power transfer device (a wireless power transmission system) as illustrated in Japanese Unexamined Patent Application Publication No. 2002-101578 and so forth have been proposed. FIG. 9 is an explanatory diagram illustrating the configuration of a non-contact power transfer device 200 according to Japanese Unexamined Patent Application Publication No. 2002-101578.

As illustrated in FIG. 9, the non-contact power transfer device 200 includes a primary-side circuit corresponding to the power transmitting device and a secondary-side circuit corresponding to the power receiving device. The primary-side circuit includes a direct-current power supply 210, an inverter circuit 203 connected to the direct-current power supply 210, and a primary coil 205a connected to the inverter circuit 203. The inverter circuit 203 includes capacitors 211, 212, and 213, switching elements 214 and 215 such as FETs, and diodes 214b and 215b.

The secondary-side circuit includes a secondary coil 205b equipped with a center tap, a rectifier circuit 221 connected to the secondary coil 205b, and a load 209 connected to the rectifier circuit 221. The rectifier circuit 221 includes a load matching capacitor 216, diodes 217 and 218, a current smoothing reactor 219, and a smoothing capacitor 220.

The inverter circuit 203 generates an alternating-current electric signal used for transmitting electric power. The electric signal generated by the inverter circuit 203 is applied to the primary coil 205a. The primary coil 205a and the secondary coil 205b constitute an attachable and detachable transformer 205, and if the primary coil 205a and the secondary coil 205b are situated close to each other, electromagnetic induction is produced between the primary coil 205a and the secondary coil 205b. In addition, the alternating-current electric signal applied to the primary coil 205a is transmitted to the secondary coil 205b using the electromagnetic induction between the primary coil 205a and the secondary coil 205b. The electric signal transmitted to the secondary coil 205b is output to the load 209 after being converted into a direct-current electric signal through the rectifier circuit 221.

In this way, in the non-contact power transfer device 200, electric power is transmitted from the primary-side circuit to the secondary-side circuit in a non-contact manner (wirelessly) using the electromagnetic induction between the primary coil 205a and the secondary coil 205b.

As a wireless power transmission system of the related art based on the magnetic resonance method, a non-contact power feeding system (a wireless power transmission system) according to Japanese Unexamined Patent Application Publication No. 2010-193598 and so forth have been proposed. FIG. 10 is an explanatory diagram illustrating the configuration of a non-contact power feeding system 300 according to Japanese Unexamined Patent Application Publication No. 2010-193598.

As illustrated in FIG. 10, the non-contact power feeding system 300 includes a power feeding facility 301 (a power transmitting device) and a power receiving device 302. The power feeding facility 301 includes a high-frequency power-supply device 310, a primary coil 320, a primary self-resonance coil 330, and a control device 340. The high-frequency power-supply device 310 generates a predetermined high-frequency voltage, based on a driving signal received from the control device 340, and supplies a high-frequency power used for transmitting electric power. The primary coil 320 transmits, to the primary self-resonance coil 330, the high-frequency power supplied by the high-frequency power-supply device 310. The primary self-resonance coil 330 is an LC resonance coil used for transmitting electric power. C1 is the stray capacitance of the primary self-resonance coil 330.

The power receiving device 302 includes a secondary self-resonance coil 360 and a secondary coil 370. The secondary self-resonance coil 360 is an LC resonance coil for receiving electric power. C2 is the stray capacitance of the secondary self-resonance coil 360. The secondary coil 370 extracts the electric power received by the secondary self-resonance coil 360 and outputs the extracted electric power, to a load 303.

In addition, by using resonance (magnetic resonance) generated between the primary self-resonance coil 330 and the secondary self-resonance coil 360, the non-contact power feeding system 300 transmits electric power from the power feeding facility 301 to the power receiving device 302 in a non-contact manner (wirelessly).

In recent years, there has been a growing need for a wireless power transmission system compatible with two transmission methods such as both the electromagnetic induction method and the magnetic resonance method. In other words, there has been desired practical use of a wireless power transmission system in which electric power can be transmitted from a power transmitting device to a power receiving device even if the power receiving device is a device compatible with any transmission method of the electromagnetic induction method and the magnetic resonance method, or a wireless power transmission system in which electric power can be transmitted from a power transmitting device to a power receiving device even if the power transmitting device is a device compatible with any transmission method of the electromagnetic induction method and the magnetic resonance method.

In addition, in recent years, even in the electromagnetic induction method, a plurality of transmission methods whose transmission frequencies are different have been proposed, and there has been a growing need for a wireless power transmission system compatible with these transmission methods. In the same way, even in the magnetic resonance method, a plurality of transmission methods whose transmission frequencies are different have been proposed, and there has been a growing need for a wireless power transmission system compatible with these transmission methods.

These and other drawbacks exist.

SUMMARY OF THE DISCLOSURE

A technology relating to a wireless power transmission system compatible with two different transmission methods is not disclosed in Japanese Unexamined Patent Application Publication No. 2002-101578 or Japanese Unexamined Patent Application Publication No. 2010-193598. However, on, for example, a power transmitting device side, a method for applying, to two power transmitting coils, electric signals used for transmitting electric power and compatible with the respective transmission methods is conceivable. However, in such a method, if the two power transmitting coils are arranged so as to be situated close to each other, unnecessary magnetic field coupling is produced between the two power transmitting coils. In addition, there is a possibility that an electric signal transmitted from one power transmitting coil of the two power transmitting coils is transmitted to the other power transmitting coil by the magnetic field coupling between the two power transmitting coils and in association therewith, the efficiency of the transmission from the power transmitting device to the power receiving device (the transmission efficiency of electric power at the time of transmitting the electric power from the power transmitting device to the power receiving device) is reduced.

In addition, on a power receiving device side, a method for arranging two power receiving coils compatible with the respective transmission methods and causing electric signals compatible with the respective transmission methods to be received is conceivable. However, in such a method, if the two power receiving coils are arranged so as to be situated close to each other, unnecessary magnetic field coupling is produced between the two power receiving coils. In addition, there is a possibility that a portion of an electric signal received by one power receiving coil of the two power receiving coils is transmitted to the other power receiving coil by the magnetic field coupling between the two power receiving coils and in association therewith, the efficiency of the transmission from the power transmitting device to the power receiving device is reduced.

The embodiments disclosed herein were made in view of such an actual situation of the related art and provide a wireless power transmission system compatible with two transmission methods and capable of suppressing a reduction of the efficiency of the transmission from a power transmitting device to a power receiving device.

According to an example embodiment, a wireless power transmission system includes a power transmitting device including a power transmitting coil, and a power receiving device including a power receiving coil, wherein electric power is wirelessly transmitted from the power transmitting device to the power receiving device by using magnetic field coupling between the power transmitting coil and the power receiving coil, the power transmitting device includes a power transmitting circuit configured to generate an electric signal used for transmitting electric power, a first power transmitting coil compatible with a first transmission method, a second power transmitting coil compatible with a second transmission method, a first magnetic substance on which the first power transmitting coil is placed, a second magnetic substance on which the second power transmitting coil is placed, and a power feeding surface on which the power receiving device is to be placed, the first magnetic substance includes a first attachment surface on which the first power transmitting coil is placed, the second magnetic substance includes a second attachment surface on which the second power transmitting coil is placed, and the first attachment surface and the second attachment surface are located on a lower side of the power feeding surface and arranged on a same plane surface parallel to the power feeding surface.

In the wireless power transmission system of this embodiment, the power transmitting device includes the first power transmitting coil compatible with the first transmission method, and the second power transmitting coil compatible with the second transmission method. Therefore, even if the power receiving device is a device compatible with any method of the two transmission methods, it is possible to transmit electric power from the power transmitting device to the power receiving device.

Furthermore, the power transmitting device includes the first magnetic substance on which the first power transmitting coil is placed, and the second magnetic substance on which the second power transmitting coil is placed. Therefore, by concentrating a magnetic flux generated by the first power transmitting coil into the inside of the first magnetic substance, it is possible to suppress magnetic field coupling between the first power transmitting coil and the second power transmitting coil. In addition, by concentrating a magnetic flux generated by the second power transmitting coil into the inside of the second magnetic substance, it is possible to suppress the magnetic field coupling between the first power transmitting coil and the second power transmitting coil.

Furthermore, the first attachment surface and the second attachment surface are located on the lower side of the power feeding surface and are arranged on the same plane surface parallel to the power feeding surface. Therefore, it is possible to inhibit the magnetic flux radiated upward by the first power transmitting coil from being blocked by the second magnetic substance. In addition, it is possible to effectively magnetic-field-couple the first power transmitting coil and the power receiving coil to each other. In addition, it is possible to inhibit the magnetic flux radiated upward by the second power transmitting coil from being blocked by the first magnetic substance. In addition, it is possible to effectively magnetic-field-couple the second power transmitting coil and the power receiving coil to each other. As a result, it is possible to suppress a reduction of the efficiency of the transmission from the power transmitting device to the power receiving device.

In the wireless power transmission system according to an example embodiment of the present disclosure, the first power transmitting coil may be a coil compatible with an electromagnetic induction method, and the second power transmitting coil may be a coil compatible with a magnetic resonance method.

In the wireless power transmission system of this embodiment, the first power transmitting coil may be the coil compatible with the electromagnetic induction method, and the second power transmitting coil may be the coil compatible with the magnetic resonance method. The electromagnetic induction method is a transmission method in which the power transmitting coil and the power receiving coil are situated close to each other and electric power is transmitted, and the magnetic resonance method is a transmission method in which electric power is able to be transmitted even in a case where the power transmitting coil and the power receiving coil are separated from each other by a distance. Therefore, even in a case where the power transmitting device and the power receiving device are situated close to each other, and even in a case where the power transmitting coil and the power receiving coil are separated from each other by a distance, it is possible to transmit electric power from the power transmitting device to the power receiving device. As a result, it is possible to expand the degree of freedom for a distance between the power transmitting device and the power receiving device.

In the wireless power transmission system according to an example embodiment of the present disclosure, a coil diameter of the second power transmitting coil may be larger than a coil diameter of the first power transmitting coil, and the second power transmitting coil may be arranged so as to surround the first power transmitting coil when viewed from above.

In the wireless power transmission system of this embodiment, the coil diameter of the second power transmitting coil may be larger than the coil diameter of the first power transmitting coil, and the second power transmitting coil may be arranged so as to surround the first power transmitting coil when viewed from above. Therefore, by effectively utilizing a space inside the second power transmitting coil, it is possible to downsize the power transmitting device.

Furthermore, the second power transmitting coil may be the coil compatible with the magnetic resonance method, and the coil diameter of the second power transmitting coil may be larger than the coil diameter of the first power transmitting coil. In the wireless power transmission of the magnetic resonance method, it is possible to increase a transmission distance (a distance at which electric power is able to be effectively transmitted) with an increase in the coil diameter of the power transmitting coil. Therefore, in a case where the power receiving device is distant from the power feeding surface, electric power transmission from the power transmitting device to the power receiving device is easily maintained.

In the wireless power transmission system according to an example embodiment of the present disclosure, the first attachment surface and the second attachment surface may be ring-shaped surfaces each including a predetermined width, the second attachment surface may be arranged so as to surround the first attachment surface when viewed from above, the first power transmitting coil may be arranged so as to occupy a substantially intermediate position between an inner circumference and an outer circumference of the first attachment surface, and the second power transmitting coil may be arranged so as to occupy a substantially intermediate position between an inner circumference and an outer circumference of the second attachment surface.

In the wireless power transmission system of this embodiment, the first attachment surface may be the ring-shaped surface having the predetermined width, and the first power transmitting coil may be arranged so as to occupy the substantially intermediate position between the inner circumference and the outer circumference of the first attachment surface. Therefore, the magnetic flux generated by the first power transmitting coil is easily concentrated into the first magnetic substance, and furthermore, the first power transmitting coil and the second power transmitting coil are easily separated from each other. As a result, in the wireless power transmission system of this configuration, it is possible to suppress the magnetic field coupling between the first power transmitting coil and the second power transmitting coil, and it is possible to further suppress a reduction of the efficiency of the transmission from the power transmitting device to the power receiving device.

In addition, the second attachment surface may be the ring-shaped surface having the predetermined width and may be arranged so as to surround the first attachment surface when viewed from above. In addition, the second power transmitting coil may be arranged so as to occupy the substantially intermediate position between the inner circumference and the outer circumference of the second attachment surface. Therefore, the magnetic flux generated by the second power transmitting coil is easily concentrated into the second magnetic substance, and furthermore, the first power transmitting coil and the second power transmitting coil are easily separated from each other. As a result, in the wireless power transmission system of this configuration, it is possible to suppress the magnetic field coupling between the first power transmitting coil and the second power transmitting coil, and it is possible to further suppress a reduction of the efficiency of the transmission from the power transmitting device to the power receiving device.

According to an example embodiment of the present disclosure, a wireless power transmission system includes a power transmitting device including a power transmitting coil, and a power receiving device including a power receiving coil, wherein electric power is wirelessly transmitted from the power transmitting device to the power receiving device using magnetic field coupling between the power transmitting coil and the power receiving coil, the power receiving device includes a first power receiving coil compatible with a first transmission method, a second power receiving coil compatible with a second transmission method, a power receiving circuit to which the first power receiving coil and the second power receiving coil are connected, a third magnetic substance placed on the first power receiving coil, a fourth magnetic substance placed on the second power receiving coil, and a power receiving surface to be placed on the power transmitting device, the third magnetic substance includes a third attachment surface in contact with the first power receiving coil, the fourth magnetic substance includes a fourth attachment surface in contact with the second power receiving coil, and the third attachment surface and the fourth attachment surface are located on an upper side of the power receiving surface and arranged on a same plane surface parallel to the power receiving surface.

In the wireless power transmission system of this embodiment, the power receiving device includes the first power receiving coil compatible with the first transmission method, and the second power receiving coil compatible with the second transmission method. Therefore, even if the power transmitting device is a device compatible with any method of the two transmission methods, it is possible to transmit electric power from the power transmitting device to the power receiving device.

Furthermore, the power receiving device includes the third magnetic substance placed on the first power receiving coil, and the fourth magnetic substance placed on the second power receiving coil. Therefore, by concentrating a magnetic flux generated by the first power receiving coil into the inside of the third magnetic substance, it is possible to suppress magnetic field coupling between the first power receiving coil and the second power receiving coil. In addition, by concentrating a magnetic flux generated by the second power receiving coil into the inside of the fourth magnetic substance, it is possible to suppress magnetic field coupling between the first power receiving coil and the second power receiving coil.

Furthermore, the third attachment surface and the fourth attachment surface are located on the upper side of the power receiving surface and are arranged on the same plane surface parallel to the power receiving surface. Therefore, it is possible to inhibit a magnetic flux radiated from the power transmitting coil toward the first power receiving coil from being blocked by the fourth magnetic substance. In addition, it is possible to effectively magnetic-field-couple the power transmitting coil and the first power receiving coil to each other. In addition, it is possible to inhibit a magnetic flux radiated from the power transmitting coil toward the second power receiving coil from being blocked by the third magnetic substance. In addition, it is possible to effectively magnetic-field-couple the power transmitting coil and the second power receiving coil to each other. As a result, it is possible to suppress a reduction of the efficiency of the transmission from the power transmitting device to the power receiving device.

DESCRIPTION OF THE PREFERRED EMBODIMENTS

The following description is intended to convey a thorough understanding of the embodiments described by providing a number of specific embodiments and details involving an antenna checking circuit. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Throughout the foregoing description, it is assumed that, in each drawing, an X1 direction is a left direction, an X2 direction is a right direction, a Y1 direction is an anterior direction, a Y2 direction is a posterior direction, a Z1 direction is an upper direction, and a Z2 direction is a lower direction and an explanation will be made.

Figure 1:
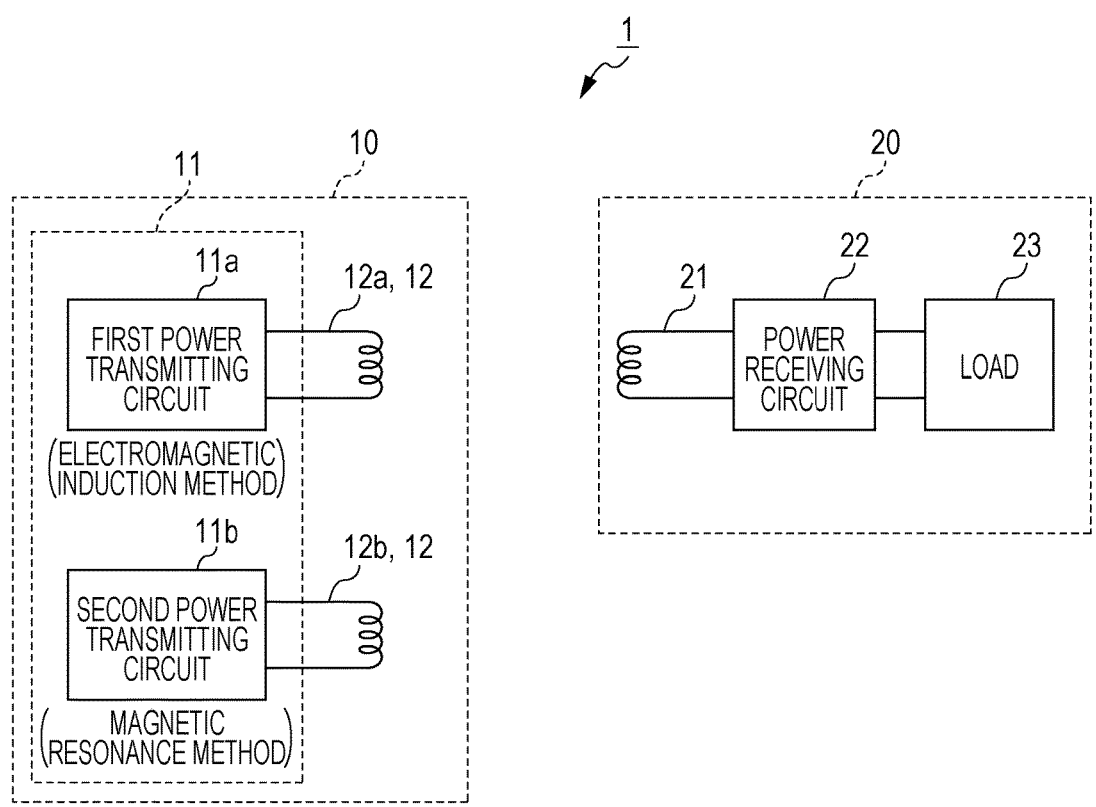
FIG. 1 is an explanatory diagram illustrating a configuration of a wireless power transmission system according to an embodiment of the present disclosure.
Figure 2A:
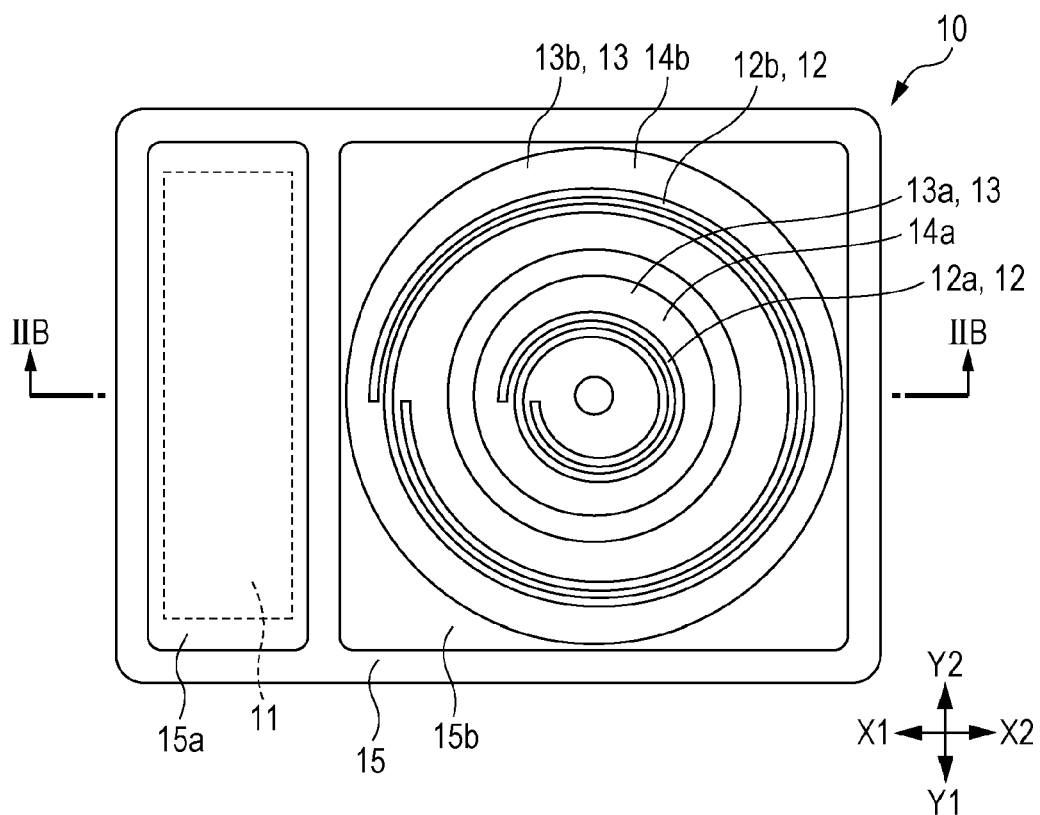
FIGS. 2A and 2B are explanatory diagrams illustrating a structure of a power transmitting device illustrated in FIG. 1.
Figure 2B:
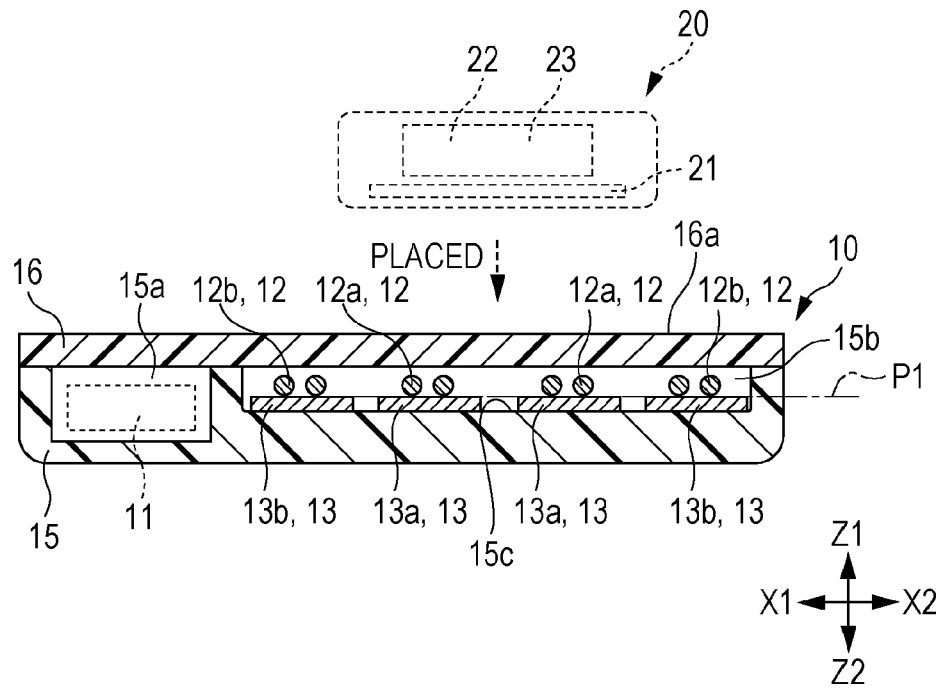
Figure 3A:
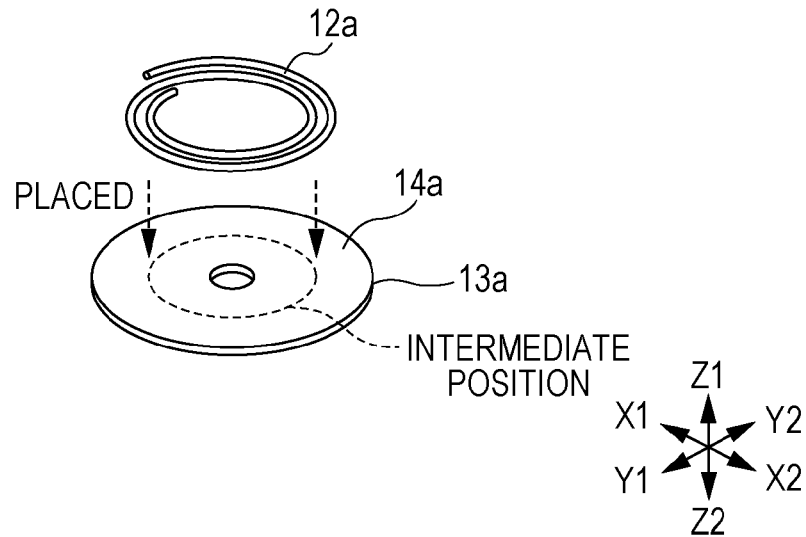
FIGS. 3A and 3B are explanatory diagrams illustrating structures of power transmitting coils and power-transmitting-side magnetic substances illustrated in FIGS. 2A and 2B.
Figure 3B:
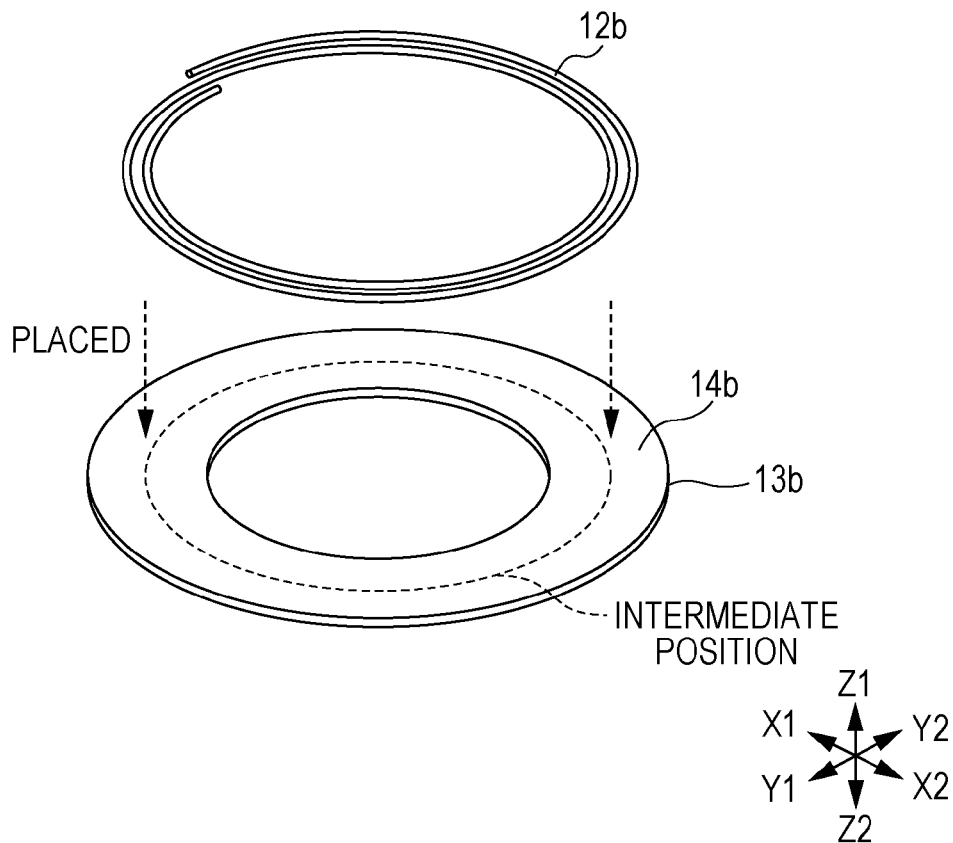
Figure 4A:
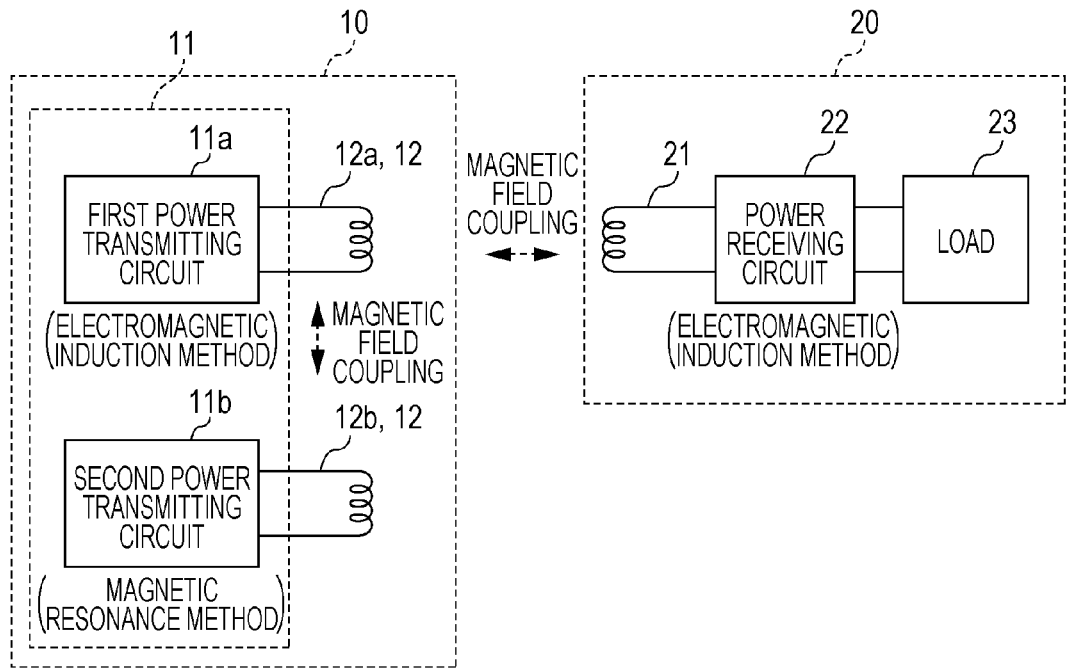
FIGS. 4A and 4B are explanatory diagrams illustrating power transmission methods of the wireless power transmission system illustrated in FIG. 1.
Figure 4B:
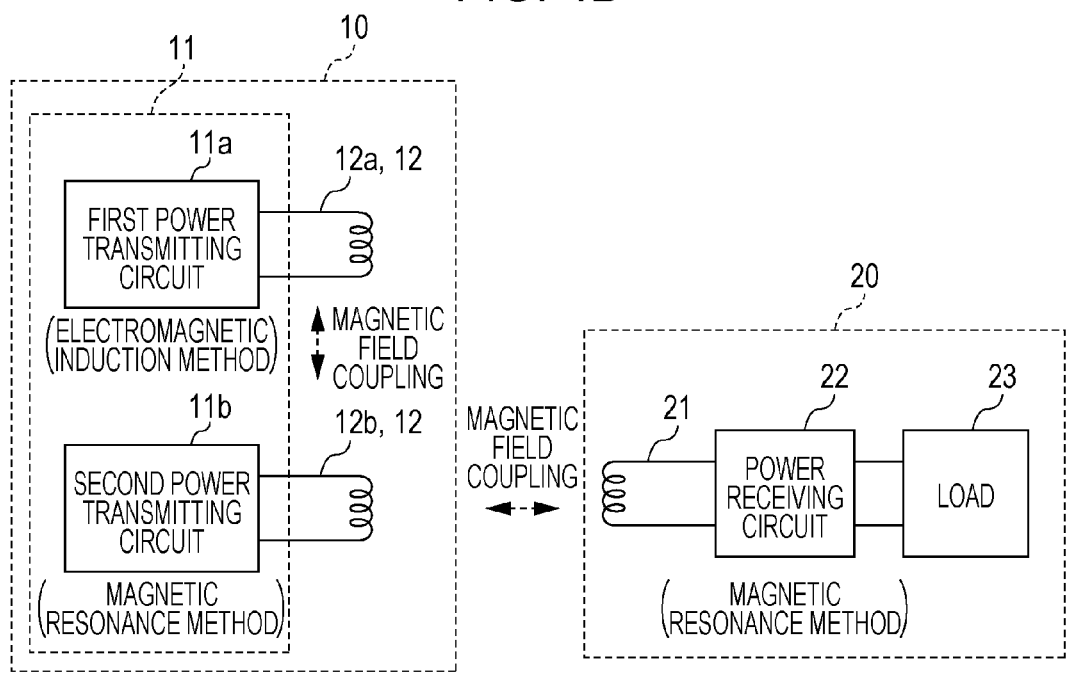

FIGS. 1 through 4B illustrate a wireless power transmission system 1 according to an example embodiment of the present disclosure. FIG. 1 is an explanatory diagram illustrating the configuration of the wireless power transmission system 1 according to an example embodiment. FIGS. 2A and 2B are explanatory diagrams illustrating the structure of a power transmitting device 10 illustrated in FIG. 1. FIG. 2A is a pattern diagram illustrating a structure at the time of viewing the power transmitting device 10 from above. In FIG. 2A, in order to easily understand an inner structure, a cover 16 is omitted. FIG. 2B is a pattern diagram illustrating the structure of a cross-section IIB-IIB in FIG. 2A. FIGS. 3A and 3B are explanatory diagrams illustrating the structures of power transmitting coils 12 and power-transmitting-side magnetic substances 13 illustrated in FIGS. 2A and 2B. FIG. 3A is an exploded perspective view illustrating the structures of a first power transmitting coil 12a and a first magnetic substance 13a. FIG. 3B is an exploded perspective view illustrating the structures of a second power transmitting coil 12b and a second magnetic substance 13b. FIGS. 4A and 4B are explanatory diagrams illustrating power transmission methods of the wireless power transmission system 1 illustrated in FIG. 1. FIG. 4A is an explanatory diagram in a case where a power receiving device 20 is a device compatible with an electromagnetic induction method. FIG. 4B is an explanatory diagram in a case where the power receiving device 20 is a device compatible with a magnetic resonance method.

As illustrated in FIG. 1, the wireless power transmission system 1 may include the power transmitting device 10 and the power receiving device 20. The wireless power transmission system 1 may be a wireless power transmission system compatible with the transmission methods of both the electromagnetic induction method and the magnetic resonance method. The electromagnetic induction method may refer to a transmission method in which a power transmitting coil and a power receiving coil are situated close to each other and electric power is transmitted from the power transmitting device to the power receiving device using electromagnetic induction between the power transmitting coil and the power receiving coil. The magnetic resonance method may refer to a transmission method in which electric power can be transmitted from the power transmitting device to the power receiving device using magnetic resonance between the power transmitting coil and the power receiving coil even if the power transmitting coil and the power receiving coil are separated from each other by a distance.

The power transmitting device 10 may be a power transmitting device compatible with the transmission methods of both the electromagnetic induction method and the magnetic resonance method. As illustrated in FIG. 1 and FIGS. 2A and 2B, the power transmitting device 10 may include a power transmitting circuit 11, two power transmitting coils 12 connected to the power transmitting circuit 11, two power-transmitting-side magnetic substances 13 on which the respective power transmitting coils 12 are placed, a power-transmitting-side case 15 that houses the power transmitting circuit 11, the power transmitting coils 12, and the power-transmitting-side magnetic substances 13, and the cover 16 fixed on the upper side of the power-transmitting-side case 15.

The power transmitting circuit 11 may include a first power transmitting circuit 11a and a second power transmitting circuit 11b. The first power transmitting circuit 11a may generate an electric signal used for transmitting electric power and compatible with the electromagnetic induction method. As the electric signal compatible with the electromagnetic induction method, usually an alternating-current electric signal of a frequency in the vicinity of several tens of kHz to several hundreds of kHz may be used. As the first power transmitting circuit 11a, a circuit such as an inverter circuit may be used, for example.

The second power transmitting circuit 11b may generate an electric signal used for transmitting electric power and be compatible with the magnetic resonance method. As the electric signal compatible with the magnetic resonance method, usually an alternating-current electric signal of a frequency in the vicinity of several MHz to several tens of MHz may be used. As the second power transmitting circuit 11b, a circuit such as an inverter circuit may be used, for example.

Power transmitting device 10 further may include a control circuit and an input device such as an operation switch, not illustrated, and may be able to select, based on a predetermined input operation performed on the input device, which transmission method of the electromagnetic induction method and the magnetic resonance method electric power transmission is to be performed by.

The two power transmitting coils 12 may be the first power transmitting coil 12a and the second power transmitting coil 12b. As illustrated in FIGS. 2A and 2B, the first power transmitting coil 12a may be a spiral coil wound near to the outer circumference of a circular disk. The first power transmitting coil 12a may be compatible with the electromagnetic induction method. Both the end portions of the first power transmitting coil 12a may be connected to the first power transmitting circuit 11a through wiring lines not illustrated. In addition, the electric signal generated by the first power transmitting circuit 11a may be applied to the first power transmitting coil 12a. A conductive wire made of metal may be wound in a predetermined shape, thereby forming the first power transmitting coil 12a.

As illustrated in FIGS. 2A and 2B, the second power transmitting coil 12b may be a spiral coil wound near to the outer circumference of a circular disk. The second power transmitting coil 12b may be compatible with the magnetic resonance method. The coil diameter of the second power transmitting coil 12b may be set so as to be larger than the coil diameter of the first power transmitting coil 12a. In addition, the second power transmitting coil 12b may be arranged so as to surround the first power transmitting coil 12a when viewed from above. In addition, the second power transmitting coil 12b is caused to resonate at a predetermined frequency by inductance and stray capacitance included therein.

Both the end portions of the second power transmitting coil 12b may be connected to the second power transmitting circuit 11b through wiring lines not illustrated. In addition, the electric signal generated by the second power transmitting circuit 11b may be applied to the second power transmitting coil 12b. A conductive wire made of metal is wound in a predetermined shape, thereby forming the second power transmitting coil 12b.

The two power-transmitting-side magnetic substances 13 may be the first magnetic substance 13a and the second magnetic substance 13b. As illustrated in FIGS. 2A and 2B, the first magnetic substance 13a may be a sheet-shaped member that has an annular-shaped top surface having a predetermined width. In addition, as illustrated in FIG. 3A, the top surface of the first magnetic substance 13a may be a first attachment surface 14a on which the first power transmitting coil 12a is to be placed. Metal fine particles of a soft magnetic substance or the like having predetermined magnetic permeability may be mixed into a synthetic resin and formed into a predetermined shape, thereby obtaining the first magnetic substance 13a.

As illustrated in FIGS. 2A and 2B, the second magnetic substance 13b may be a sheet-shaped member that has an annular-shaped top surface having a predetermined width. In addition, as illustrated in FIG. 3A, the top surface of the second magnetic substance 13b may be a second attachment surface 14b on which the second power transmitting coil 12b is to be placed. Note that the outer diameter of the second attachment surface 14b may be set so as to be larger than the outer diameter of the first attachment surface 14a. In addition, the second attachment surface 14b may be arranged so as to surround the first attachment surface 14a when viewed from above. Metal fine particles of a soft magnetic substance or the like having predetermined magnetic permeability are mixed into a synthetic resin and formed into a predetermined shape, thereby obtaining the second magnetic substance 13b.

The power-transmitting-side case 15 may be a substantially rectangular parallelepiped member made of a synthetic resin or the like and may include a circuit housing portion 15a and a coil housing portion 15b. The power transmitting circuit 11 may be housed In the circuit housing portion 15a. The first power transmitting coil 12a, the second power transmitting coil 12b, the first magnetic substance 13a, and the second magnetic substance 13b may be housed In the coil housing portion 15b.

The bottom surface 15c of the coil housing portion 15b may be a plane surface that extends in a horizontal direction, and the first magnetic substance 13a and the second magnetic substance 13b may be stuck on the bottom surface 15c. It is desirable that the first magnetic substance 13a and the second magnetic substance 13b may be arranged at a uniform height so that the first attachment surface 14a and the second attachment surface 14b are located on a virtual plane surface P1 that extends in the horizontal direction.

In addition, the first power transmitting coil 12a may be placed on the first attachment surface 14a, and the second power transmitting coil 12b may be placed on the second attachment surface 14b. The first power transmitting coil 12a may be placed so as to occupy a substantially intermediate position between the inner circumference and the outer circumference of the first attachment surface 14a. The second power transmitting coil 12b may be placed so as to occupy a substantially intermediate position between the inner circumference and the outer circumference of the second attachment surface 14b.

The cover 16 may be a plate-like member made of a synthetic resin or the like and may have a plate surface having substantially rectangular shapes on the top and bottom thereof. In addition, the cover 16 may be fixed to the upper side of the power-transmitting-side case 15 so as to cover the circuit housing portion 15a and the coil housing portion 15b. The top surface of the cover 16 may be a plane surface that extends in the horizontal direction and is a power feeding surface 16a on which the power receiving device 20 is to be placed. As a result, the first attachment surface 14a and the second attachment surface 14b may be located on the lower side of the power feeding surface 16a and become surfaces parallel to the power feeding surface 16a. In addition, the first power transmitting coil 12a and the second power transmitting coil 12b may be arranged on the lower side (back surface side) of the power feeding surface 16a.

The power receiving device 20 may be a power receiving device compatible with the transmission method of one of the electromagnetic induction method and the magnetic resonance method. The power receiving device 20 may be a power receiving device limited to the transmission method of one thereof or may be a power receiving device capable of switching a transmission method by an operation switch or the like. As illustrated in FIG. 1, the power receiving device 20 may include a power receiving coil 21, a power receiving circuit 22, and a load 23. In addition, as illustrated in FIGS. 2A and 2B, the power receiving device 20 may be placed on the power feeding surface 16a so that the power transmitting coils 12 and the power receiving coil 21 face each other while sandwiching therebetween the cover 16.

The power receiving coil 21 may be magnetic-field-coupled to one of the two power transmitting coils 12. In a case where the power receiving device 20 is a device compatible with the electromagnetic induction method, the power receiving coil 21 may be magnetic-field-coupled to the first power transmitting coil 12a, as illustrated in FIG. 4A. In such a case, the first power transmitting coil 12a and the power receiving coil 21 may be coupled to each other by electromagnetic induction.

In a case where the power receiving device 20 is a device compatible with the magnetic resonance method, the power receiving coil 21 may be magnetic-field-coupled to the second power transmitting coil 12b, as illustrated in FIG. 4B. In such a case, the power receiving coil 21 resonates at a predetermined frequency, and the second power transmitting coil 12b and the power receiving coil 21 are coupled to each other by magnetic resonance.

In addition, using the magnetic field coupling between the power transmitting coil 12 and the power receiving coil 21, an alternating-current electric signal applied to the power transmitting coil 12 may be transmitted to the power receiving coil 21. Note that, in the same way as the power transmitting coils 12, a conductive wire made of metal may be wound in a predetermined shape, thereby forming the power receiving coil 21.

The power receiving circuit 22 may be a circuit including a rectifier circuit, a smoothing circuit, and so forth. The power receiving circuit 22 may be connected to both end portions of the power receiving coil 21. In addition, after rectifying, smoothing, and converting the alternating-current electric signal transmitted to the power receiving coil 21 into a direct-current electric signal, the power receiving circuit 22 may output the direct-current electric signal to the load 23. Using the magnetic field coupling between the power transmitting coil 12 and the power receiving coil 21 in this way, the wireless power transmission system 1 wirelessly transmits electric power from the power transmitting device 10 to the power receiving device 20.

Figure 5A:
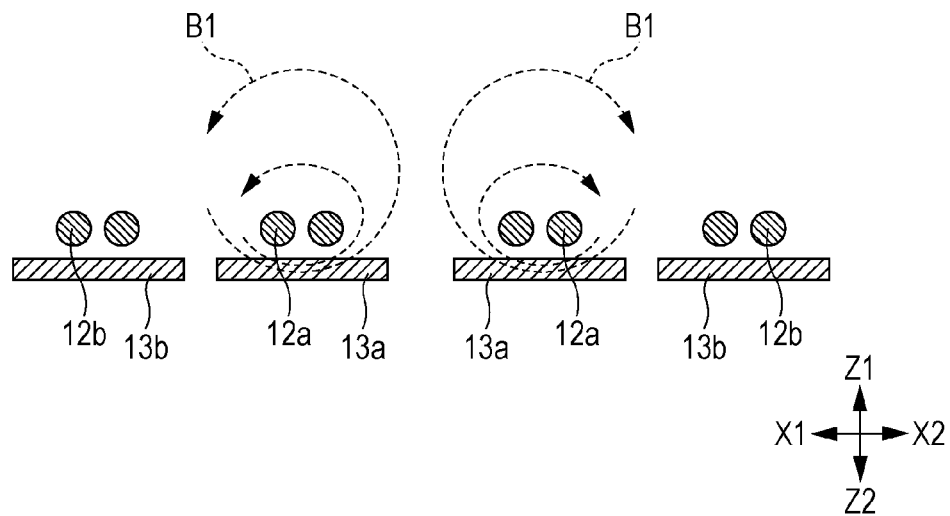
FIGS. 5A and 5B are explanatory diagrams illustrating magnetic flux distributions of the power transmitting coils illustrated in FIGS. 2A and 2B.
Figure 5B:
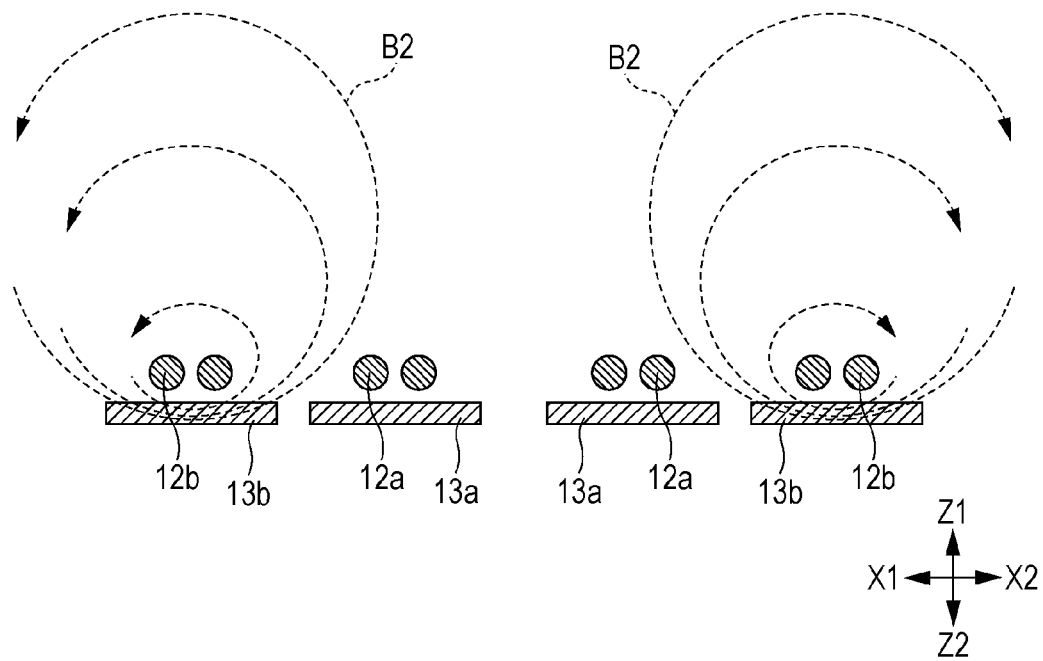
Figure 6A:
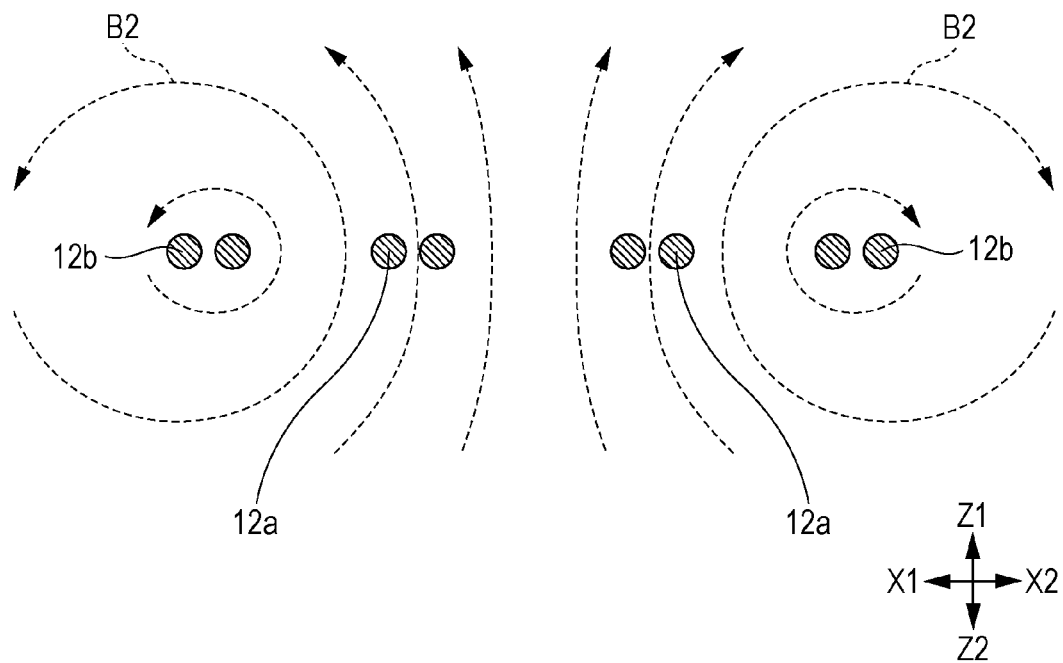
FIGS. 6A and 6B are explanatory diagrams illustrating magnetic flux distributions of comparative examples of the power transmitting coils illustrated in FIGS. 2A and 2B.
Figure 6B:
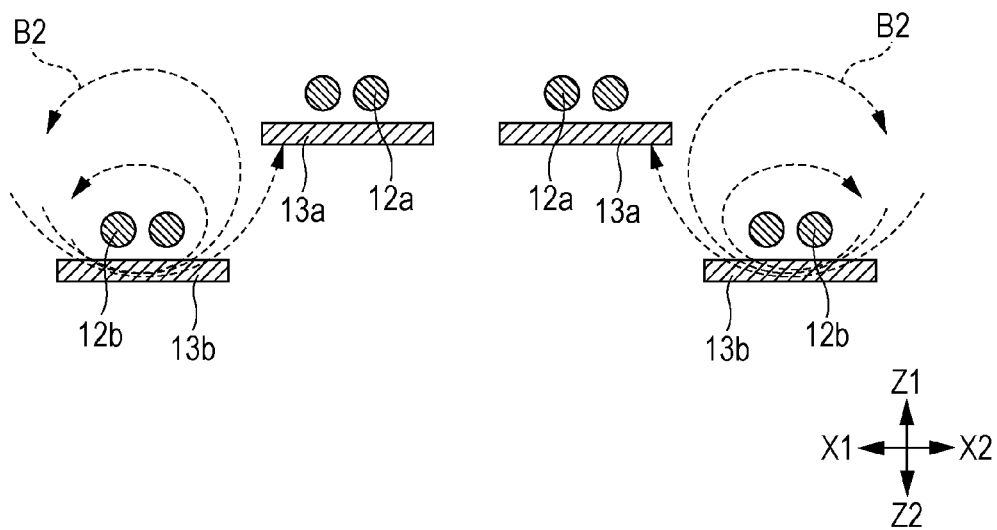

Next, the efficiency of the transmission from the power transmitting device 10 to the power receiving device 20 will be described with reference to FIGS. 5A and 5B and FIGS. 6A and 6B. FIGS. 5A and 5B are explanatory diagrams illustrating magnetic flux distributions of the power transmitting coils 12 illustrated in FIGS. 2A and 2B. FIG. 5A is a pattern diagram illustrating the distribution of a magnetic flux B1 generated by the first power transmitting coil 12a. FIG. 5B is a pattern diagram illustrating the distribution of a magnetic flux B2 generated by the second power transmitting coil 12b. Each of FIG. 5A and FIG. 5B is a pattern diagram corresponding to the cross-section IIB-IIB in FIG. 2A. FIGS. 6A and 6B are explanatory diagrams illustrating magnetic flux distributions of comparative examples of the power transmitting coils 12 illustrated in FIGS. 2A and 2B. FIG. 6A is a comparative example illustrating the distribution of the magnetic flux B2 in a case where the first magnetic substance 13a and the second magnetic substance 13b do not exist. FIG. 6B is a comparative example illustrating the distribution of the magnetic flux B2 in a case where the first power transmitting coil 12a and the first magnetic substance 13a are arranged above the second power transmitting coil 12b.

First, in a case where the power receiving device 20 is a device compatible with the electromagnetic induction method, an electric signal used for transmitting electric power may be applied to the first power transmitting coil 12a. In addition, as illustrated in FIG. 5A, the first power transmitting coil 12a may generate the magnetic flux B1 around itself. While not illustrated, in response to the magnetic flux B1 generated by the first power transmitting coil 12a, a magnetic field may be formed around the first power transmitting coil 12a. In addition, by the magnetic field formed above the first power transmitting coil 12a, the first power transmitting coil 12a and the power receiving coil 21 may be magnetic-field-coupled to each other, and it becomes possible to transmit electric power from the power transmitting device 10 to the power receiving device 20.

In addition, in response to the magnetic flux B1 generated by the first power transmitting coil 12a, a magnetic field may be formed around the second power transmitting coil 12b. In addition, by the magnetic field formed around the second power transmitting coil 12b, the first power transmitting coil 12a and the second power transmitting coil 12b may be magnetic-field-coupled to each other. If the strength of the magnetic field coupling between the first power transmitting coil 12a and the second power transmitting coil 12b increases, a portion of the electric signal applied to the first power transmitting coil 12a is transmitted to the second power transmitting coil 12b, and the efficiency of the transmission from the power transmitting device 10 to the power receiving device 20 is reduced.

However, as illustrated in FIG. 5A, the first magnetic substance 13a exists below the first power transmitting coil 12a. By concentrating the magnetic flux B1 into the inside of itself, the first magnetic substance 13a inhibits the magnetic flux B1 from expanding around the second power transmitting coil 12b. As a result, it is possible to suppress the magnetic field coupling between the first power transmitting coil 12a and the second power transmitting coil 12b.

Next, in a case where the power receiving device 20 is a device compatible with the magnetic resonance method, an electric signal used for transmitting electric power may be applied to the second power transmitting coil 12b. In addition, as illustrated in FIG. 5B, the second power transmitting coil 12b generates the magnetic flux B2 around itself. While not illustrated, in response to the magnetic flux B2 generated by the second power transmitting coil 12b, a magnetic field is formed around the second power transmitting coil 12b. In addition, by the magnetic field formed above the second power transmitting coil 12b, the second power transmitting coil 12b and the power receiving coil 21 may be magnetic-field-coupled to each other, and it becomes possible to transmit electric power from the power transmitting device 10 to the power receiving device 20. In addition, in response to the magnetic flux B2 generated by the second power transmitting coil 12b, a magnetic field may be formed around the first power transmitting coil 12a. In addition, by the magnetic field formed around the first power transmitting coil 12a, the first power transmitting coil 12a and the second power transmitting coil 12b may be magnetic-field-coupled to each other. If the strength of the magnetic field coupling between the first power transmitting coil 12a and the second power transmitting coil 12b increases, a portion of the electric signal applied to the second power transmitting coil 12b may be transmitted to the first power transmitting coil 12a, and the efficiency of the transmission from the power transmitting device 10 to the power receiving device 20 is reduced.

However, as illustrated in FIG. 5B, the second magnetic substance 13b may exist below the second power transmitting coil 12b. By concentrating the magnetic flux B2 into the inside of itself, the second magnetic substance 13b inhibits the magnetic flux B2 from expanding around the first power transmitting coil 12a. As a result, it is possible to suppress the magnetic field coupling between the first power transmitting coil 12a and the second power transmitting coil 12b.

Note that in a case where, for example, the first magnetic substance 13a and the second magnetic substance 13b do not exist in the wireless power transmission system 1, the magnetic flux B2 generated by the second power transmitting coil 12b greatly expands in the direction of the first power transmitting coil 12a, as illustrated in FIG. 6A. In addition, the strength of the magnetic field around the first power transmitting coil 12a increases, and the strength of the magnetic field coupling between the first power transmitting coil 12a and the second power transmitting coil 12b increases. As a result, a portion of the electric signal applied to the second power transmitting coil 12b may be transmitted to the first power transmitting coil 12a, and the efficiency of the transmission from the power transmitting device 10 to the power receiving device 20 is reduced.

While the influence of the magnetic flux B1 generated by the first power transmitting coil 12a is not illustrated, in a case where the first magnetic substance 13a and the second magnetic substance 13b do not exist, the magnetic flux B1 generated by the first power transmitting coil 12a expands in the direction of the second power transmitting coil 12b, and the strength of the magnetic field coupling between the first power transmitting coil 12a and the second power transmitting coil 12b increases. As a result, after all, the efficiency of the transmission from the power transmitting device 10 to the power receiving device 20 may be reduced. Therefore, magnetic substances may be arranged below the first power transmitting coil 12a and the second power transmitting coil 12b.

In addition, in a case where, for example, the first power transmitting coil 12a and the first magnetic substance 13a are arranged above the second power transmitting coil 12b in the wireless power transmission system 1, a portion of the magnetic flux B2 radiated upward from the second power transmitting coil 12b may be blocked by a blocking effect possessed by the first magnetic substance 13a and a magnetic field formed above the second power transmitting coil 12b is weakened, as illustrated in FIG. 6B. As a result, the magnetic field coupling between the first power transmitting coil 12a and the power receiving coil 21 may be suppressed, and the efficiency of the transmission from the power transmitting device 10 to the power receiving device 20 is reduced.

While a case where the second power transmitting coil 12b and the second magnetic substance 13b are arranged above the first power transmitting coil 12a is not illustrated, a portion of the magnetic flux B1 radiated upward from the first power transmitting coil 12a may be blocked, and after all the efficiency of the transmission from the power transmitting device 10 to the power receiving device 20 is reduced.

However, in the wireless power transmission system 1, the first attachment surface 14a and the second attachment surface 14b may be located on the lower side of the power feeding surface 16a and may be arranged on the same virtual plane surface P1 parallel to the power feeding surface 16a. In addition, the first power transmitting coil 12a and the second power transmitting coil 12b may be arranged so as to be roughly a same height.

Therefore, it is possible to inhibit the magnetic flux B1 radiated upward by the first power transmitting coil 12a from being blocked by the second magnetic substance 13b. In addition, it is possible to effectively magnetic-field-couple the first power transmitting coil 12a and the power receiving coil 21 to each other. In addition, it is possible to inhibit the magnetic flux B2 radiated upward by the second power transmitting coil 12b from being blocked by the first magnetic substance 13a. In addition, it is possible to effectively magnetic-field-couple the second power transmitting coil 12b and the power receiving coil 21 to each other.

In addition, in a case where, for example, the first power transmitting coil 12a is placed near the inner circumference of the first attachment surface 14a or the outer circumference thereof, a portion of the first magnetic substance 13a, situated close to the first power transmitting coil 12a, is reduced, and it becomes difficult to effectively concentrate, into the first magnetic substance 13a, the magnetic flux B1 generated by the first power transmitting coil 12a. As a result, the first power transmitting coil 12a and the second power transmitting coil 12b are easily magnetic-field-coupled to each other. Furthermore, in a case where the first power transmitting coil 12a is placed near the outer circumference of the first attachment surface 14a, a distance between the first power transmitting coil 12a and the second power transmitting coil 12b is reduced, and the first power transmitting coil 12a and the second power transmitting coil 12b are easily magnetic-field-coupled to each other.

In addition, in a case where, for example, the second power transmitting coil 12b is placed near the inner circumference of the second attachment surface 14b or the outer circumference thereof, a portion of the second magnetic substance 13b, situated close to the second power transmitting coil 12b, is reduced, and it becomes difficult to effectively concentrate, into the second magnetic substance 13b, the magnetic flux B2 generated by the second power transmitting coil 12b. As a result, the first power transmitting coil 12a and the second power transmitting coil 12b are easily magnetic-field-coupled to each other. Furthermore, in a case where the second power transmitting coil 12b is placed near the inner circumference of the second attachment surface 14b, a distance between the first power transmitting coil 12a and the second power transmitting coil 12b is reduced, and the first power transmitting coil 12a and the second power transmitting coil 12b are easily magnetic-field-coupled to each other.

However, in the wireless power transmission system 1, the first attachment surface 14a may be an annular-shaped surface having a predetermined width, and the first power transmitting coil 12a may be arranged so as to occupy a substantially intermediate position between the inner circumference and the outer circumference of the first attachment surface 14a. Therefore, the magnetic flux B1 generated by the first power transmitting coil 12a may be easily concentrated into the first magnetic substance 13a, and furthermore, the first power transmitting coil 12a and the second power transmitting coil 12b are easily separated from each other. As a result, in the wireless power transmission system 1, it is possible to suppress the magnetic field coupling between the first power transmitting coil 12a and the second power transmitting coil 12b.

In addition, the second attachment surface 14b may be an annular-shaped surface having a predetermined width and may be arranged so as to surround the first attachment surface 14a when viewed from above. In addition, the second power transmitting coil 12b may be arranged so as to occupy a substantially intermediate position between the inner circumference and the outer circumference of the second attachment surface 14b. Therefore, the magnetic flux B2 generated by the second power transmitting coil 12b may be easily concentrated into the second magnetic substance 13b, and furthermore, the first power transmitting coil 12a and the second power transmitting coil 12b are easily separated from each other. As a result, in the wireless power transmission system 1, it is possible to suppress the magnetic field coupling between the first power transmitting coil 12a and the second power transmitting coil 12b.

In the wireless power transmission system 1 of the present embodiment, the power transmitting device 10 may include the first power transmitting coil 12a compatible with the electromagnetic induction method, and the second power transmitting coil 12b compatible with the magnetic resonance method. Therefore, even if the power receiving device 20 is a device compatible with any method of the two transmission methods, it is possible to transmit electric power from the power transmitting device 10 to the power receiving device 20.

Furthermore, the power transmitting device 10 may include the first magnetic substance 13a including the first attachment surface 14a on which the first power transmitting coil 12a may be placed, and the second magnetic substance 13b including the second attachment surface 14b on which the second power transmitting coil 12b may be placed. Therefore, by concentrating the magnetic flux B1 generated by the first power transmitting coil 12a into the inside of the first magnetic substance 13a, it is possible to suppress the magnetic field coupling between the first power transmitting coil 12a and the second power transmitting coil 12b. In addition, by concentrating the magnetic flux B2 generated by the second power transmitting coil 12b into the inside of the second magnetic substance 13b, it is possible to suppress the magnetic field coupling between the first power transmitting coil 12a and the second power transmitting coil 12b.

Furthermore, the first attachment surface 14a and the second attachment surface 14b may be located on the lower side of the power feeding surface 16a and may be arranged on the same virtual plane surface P1 parallel to the power feeding surface 16a. Therefore, it is possible to inhibit the magnetic flux B1 radiated upward by the first power transmitting coil 12a from being blocked by the second magnetic substance 13b. In addition, it is possible to effectively magnetic-field-couple the first power transmitting coil 12a and the power receiving coil 21 to each other. In addition, it is possible to inhibit the magnetic flux B2 radiated upward by the second power transmitting coil 12b from being blocked by the first magnetic substance 13a. In addition, it is possible to effectively magnetic-field-couple the second power transmitting coil 12b and the power receiving coil 21 to each other. As a result, in the wireless power transmission system 1, it is possible to suppress a reduction of the efficiency of the transmission from the power transmitting device 10 to the power receiving device 20.

In addition, in the wireless power transmission system 1 of the present embodiment, the first power transmitting coil 12a may be a coil compatible with the electromagnetic induction method, and the second power transmitting coil 12b may be a coil compatible with the magnetic resonance method. The electromagnetic induction method is a transmission method in which a power transmitting coil and a power receiving coil are situated close to each other and electric power is transmitted, and the magnetic resonance method is a transmission method in which electric power is able to be transmitted even in a case where the power transmitting coil and the power receiving coil are separated from each other by a distance. Therefore, in the wireless power transmission system 1, even in a case where the power transmitting device 10 and the power receiving device 20 are situated close to each other, and even in a case where the power transmitting coil 10 and the power receiving coil 20 are separated from each other by a distance, it is possible to transmit electric power from the power transmitting device 10 to the power receiving device 20. As a result, it is possible to expand the degree of freedom for a distance between the power transmitting device 10 and the power receiving device 20.

In addition, in the wireless power transmission system 1 of the present embodiment, the coil diameter of the second power transmitting coil 12b may be larger than the coil diameter of the first power transmitting coil 12a, and the second power transmitting coil 12b may be arranged so as to surround the first power transmitting coil 12a when viewed from above. Therefore, by effectively utilizing a space inside the second power transmitting coil 12b, it is possible to downsize the power transmitting device 10.

Furthermore, the second power transmitting coil 12b may be a coil compatible with the magnetic resonance method, and the coil diameter of the second power transmitting coil 12b may be larger than the coil diameter of the first power transmitting coil 12a. In the wireless power transmission of the magnetic resonance method, it is possible to increase a transmission distance (a distance at which electric power is able to be effectively transmitted) with an increase in the coil diameter of the power transmitting coil. Therefore, even in a case where the power receiving device 20 is distant from the power feeding surface 16a, electric power transmission from the power transmitting device 10 to the power receiving device 20 is easily maintained.

In addition, in the wireless power transmission system 1 of the present embodiment, the first attachment surface 14a may be an annular-shaped surface having a predetermined width, and the first power transmitting coil 12a may be arranged so as to occupy a substantially intermediate position between the inner circumference and the outer circumference of the first attachment surface 14a. Therefore, the magnetic flux B1 generated by the first power transmitting coil 12a is easily concentrated into the first magnetic substance 13a, and furthermore, the first power transmitting coil 12a and the second power transmitting coil 12b are easily separated from each other. As a result, in the wireless power transmission system 1, it is possible to suppress the magnetic field coupling between the first power transmitting coil 12a and the second power transmitting coil 12b, and it is possible to further suppress a reduction of the efficiency of the transmission from the power transmitting device 10 to the power receiving device 20.

In addition, the second attachment surface 14b may be an annular-shaped surface having a predetermined width and may be arranged so as to surround the first attachment surface 14a when viewed from above. In addition, the second power transmitting coil 12b may be arranged so as to occupy a substantially intermediate position between the inner circumference and the outer circumference of the second attachment surface 14b. Therefore, the magnetic flux B2 generated by the second power transmitting coil 12b may be easily concentrated into the second magnetic substance 13b, and furthermore, the first power transmitting coil 12a and the second power transmitting coil 12b are easily separated from each other. As a result, in the wireless power transmission system 1, it is possible to suppress the magnetic field coupling between the first power transmitting coil 12a and the second power transmitting coil 12b, and it is possible to further suppress a reduction of the efficiency of the transmission from the power transmitting device 10 to the power receiving device 20.

In an example embodiment, the advantageous effects of the use of the magnetic substances in the power transmitting device 10 of the above-described embodiment are applied to a power receiving device side. Note that, in the present embodiment, a same symbol is assigned to a configuration and the description thereof will be omitted in a case where the configuration is the same as that of the above-mentioned embodiment.

Figure 7:
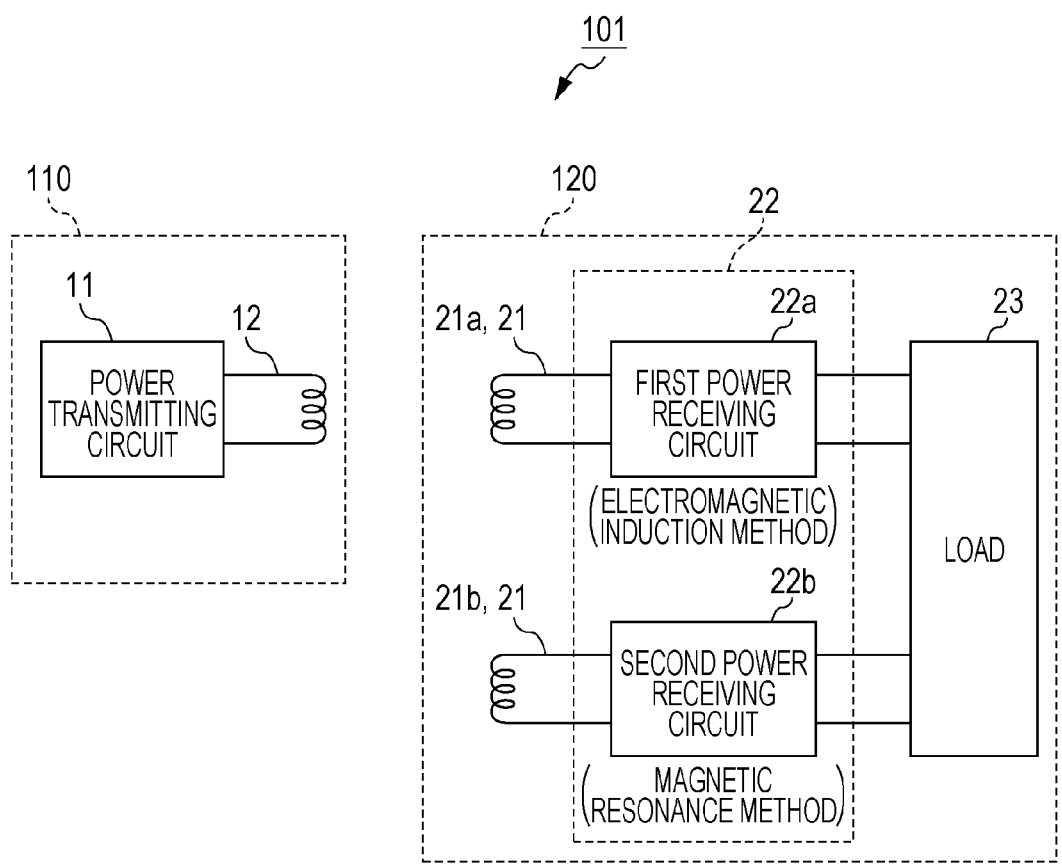
FIG. 7 is an explanatory diagram illustrating a configuration of a wireless power transmission system according to an embodiment of the present disclosure.
Figure 8A:
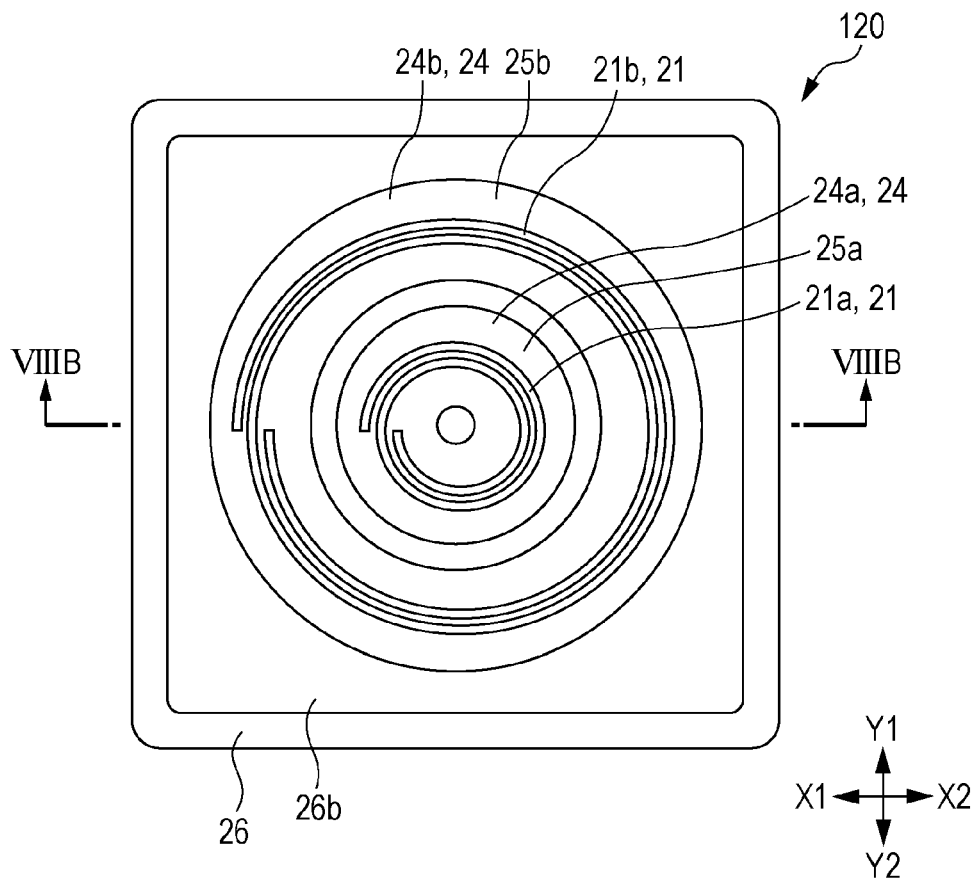
FIGS. 8A and 8B are explanatory diagrams illustrating a structure of a power receiving device illustrated in FIG. 7.
Figure 8B:
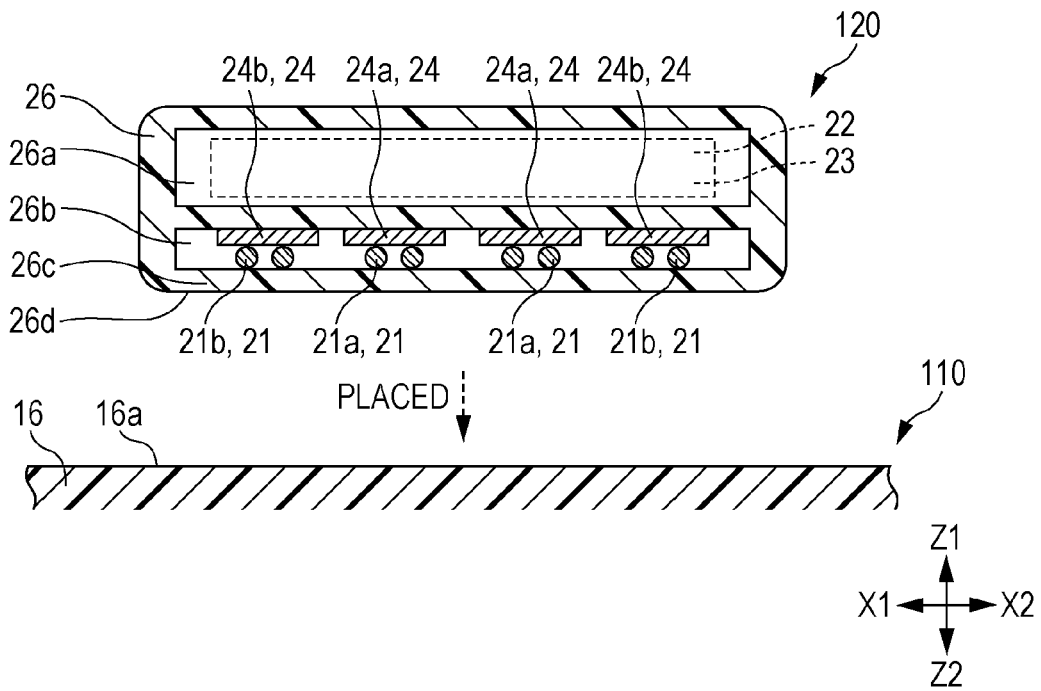
Figure 9:
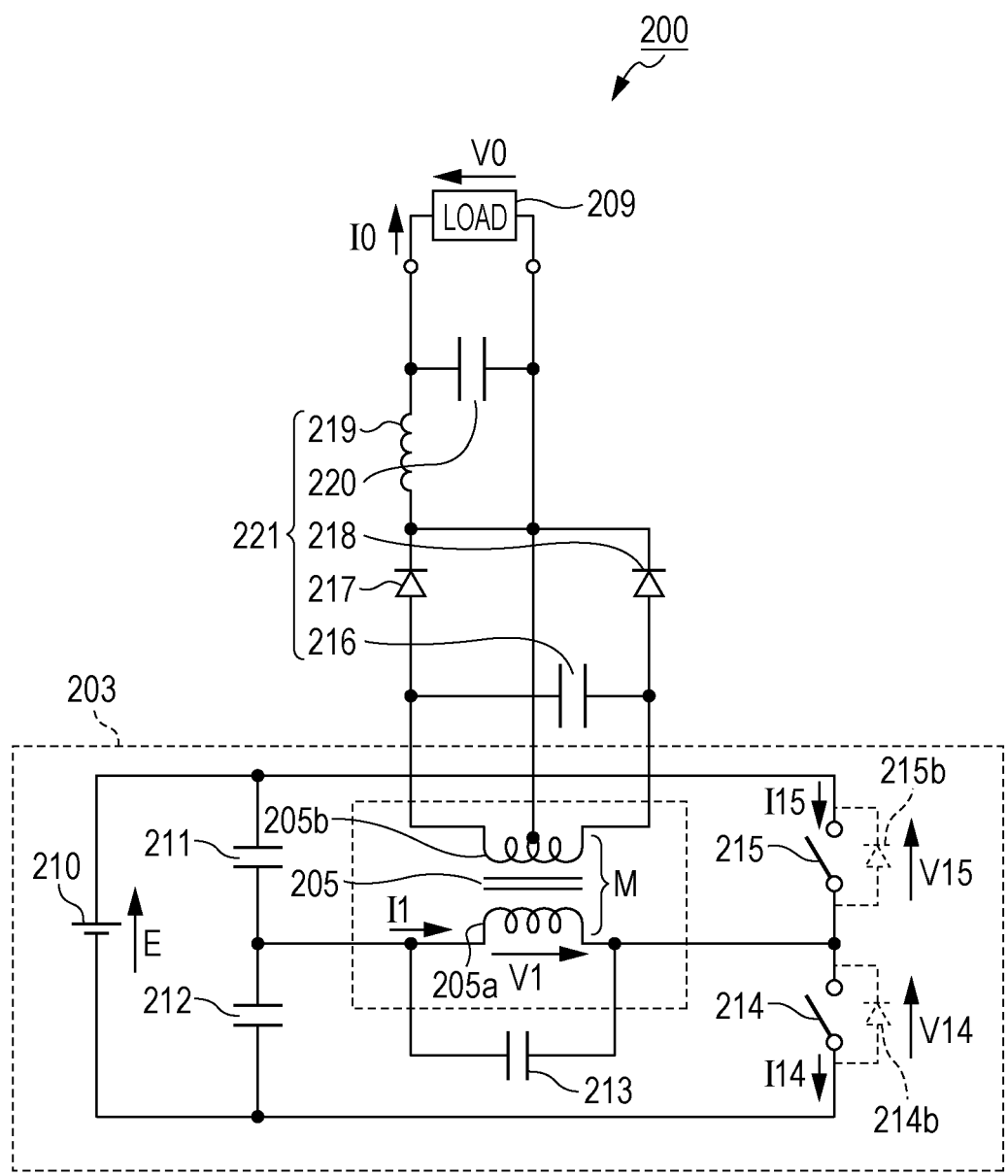
FIG. 9 is an explanatory diagram illustrating a configuration of a non-contact power transfer device in the related art.
Figure 10:
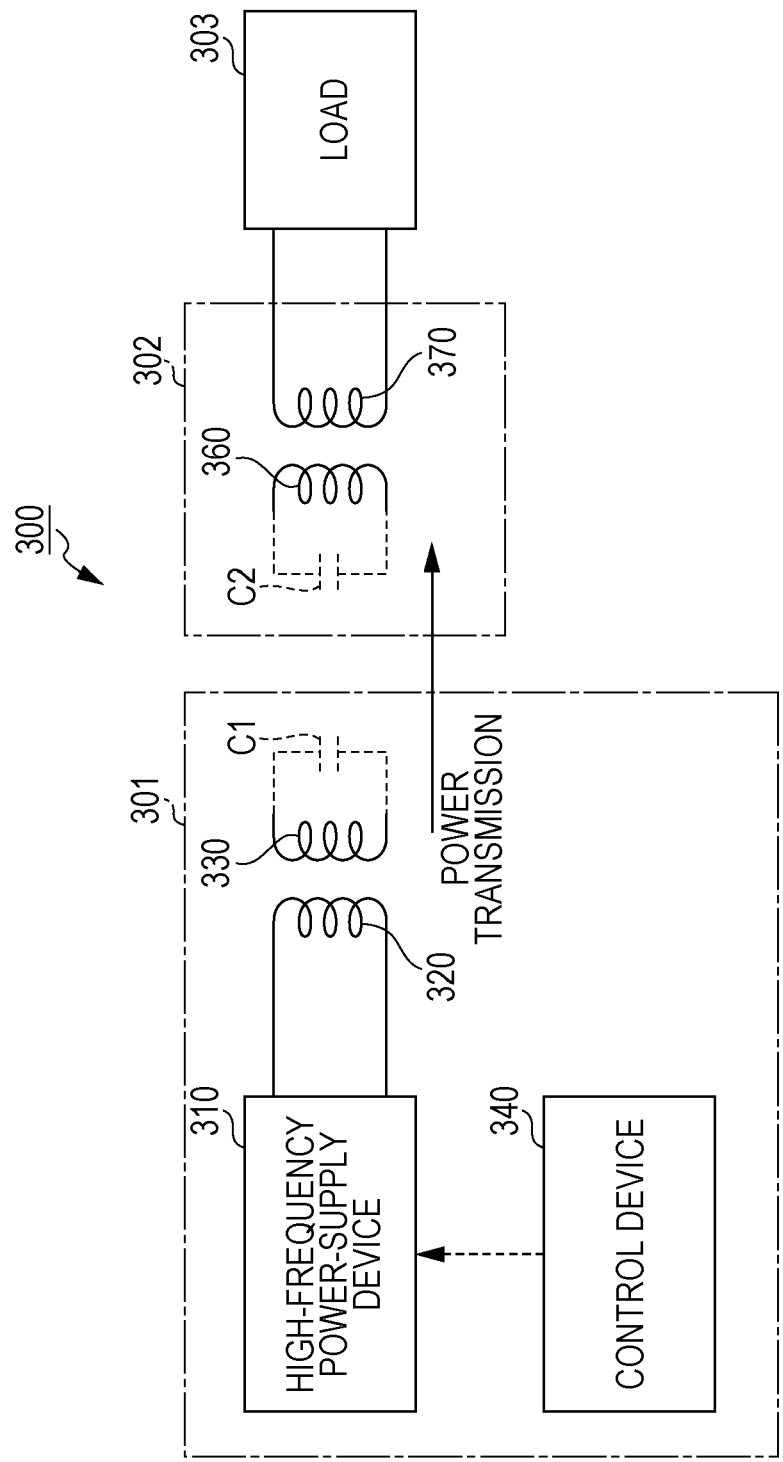
FIG. 10 is an explanatory diagram illustrating a configuration of a non-contact power feeding system in the related art.

First, the configuration of a wireless power transmission system 101 according to an example embodiment of the present disclosure will be described with reference to FIG. 7 and FIGS. 8A and 8B. FIG. 7 is an explanatory diagram illustrating the configuration of the wireless power transmission system 101 according to an example embodiment of the present disclosure. FIGS. 8A and 8B are explanatory diagrams illustrating the structure of a power receiving device 120 illustrated in FIG. 7. FIG. 8A is a pattern diagram illustrating a structure at the time of viewing the power receiving device 120 from below. In FIG. 8A, in order to easily understand an inner structure, a bottom portion 26c of a power-receiving-side case 26 is omitted. FIG. 8B is a pattern diagram illustrating the structure of a cross-section VIIIB-VIIIB in FIG. 8A.

As illustrated in FIG. 7, the wireless power transmission system 101 may include a power transmitting device 110 and the power receiving device 120. The wireless power transmission system 101 may be a wireless power transmission system compatible with the transmission methods of both the electromagnetic induction method and the magnetic resonance method.

The power transmitting device 110 may be a power transmitting device compatible with the transmission method of one of the electromagnetic induction method and the magnetic resonance method. The power transmitting device 110 may be a power transmitting device limited to the transmission method of one of the electromagnetic induction method and the magnetic resonance method or may be a power transmitting device capable of switching a transmission method by an operation switch or the like.

As illustrated in FIG. 7, the power transmitting device 110 may include a power transmitting circuit 11, and a power transmitting coil 12. The power transmitting circuit 11 may generate an electric signal used for transmitting electric power and compatible with the electromagnetic induction method or the magnetic resonance method. Both end portions of the power transmitting coil 12 may be connected to the power transmitting circuit 11 through wiring lines not illustrated. In addition, the electric signal generated by the power transmitting circuit 11 may be applied to the power transmitting coil 12.

In addition, as illustrated in FIG. 8B, the power transmitting device 110 may include the cover 16. The cover 16 may be arranged on the upper side of a power-transmitting-side case not illustrated. The top surface of the cover 16 may be a plane surface that may extend in a horizontal direction and may be the power feeding surface 16a on which the power receiving device 120 is to be placed. While not illustrated, the power transmitting coil 12 is arranged on the lower side of the power feeding surface 16a.

The power receiving device 120 may be a power receiving device compatible with the transmission methods of both the electromagnetic induction method and the magnetic resonance method. As illustrated in FIG. 7 and FIGS. 8A and 8B, the power receiving device 120 may include two power receiving coils 21, a power receiving circuit 22 to which the two power receiving coils 21 are connected, a load 23 to which the power receiving circuit 22 is connected, power-receiving-side magnetic substances 24 placed on the respective two power receiving coils, and a power-receiving-side case 26 that houses the power receiving coils 21, the power receiving circuits 22, the load 23, and the power-receiving-side magnetic substances 24.

The two power receiving coils 21 may be a first power receiving coil 21a and a second power receiving coil 21b. As illustrated in FIGS. 8A and 8B, the first power receiving coil 21a may be a spiral coil wound near to the outer circumference of a circular disk. The first power receiving coil 21a may be compatible with the electromagnetic induction method.

As illustrated in FIGS. 8A and 8B, the second power receiving coil 21b may be a spiral coil wound near to the outer circumference of a circular disk. The second power receiving coil 21b may be compatible with the magnetic resonance method. The coil diameter of the second power receiving coil 21b may be set so as to be larger than the coil diameter of the first power receiving coil 21a. In addition, the second power receiving coil 21b may be arranged so as to surround the first power receiving coil 21a when viewed from below.

In the present embodiment, one of the two power receiving coils 21 may be magnetic-field-coupled to the power transmitting coil 12. In a case where the power transmitting device 110 is a device compatible with the electromagnetic induction method, the first power receiving coil 21a is magnetic-field-coupled to the power transmitting coil 12. In such a case, the power transmitting coil 12 and the first power receiving coil 21a may be coupled to each other by electromagnetic induction. In a case where the power transmitting device 110 is a device compatible with the magnetic resonance method, the second power receiving coil 21b is magnetic-field-coupled to the power transmitting coil 12. In such a case, the power transmitting coil 12 and the second power receiving coil 21b may be coupled to each other by magnetic resonance.

The two power-receiving-side magnetic substances 24 may be a third magnetic substance 24a and a fourth magnetic substance 24b. As illustrated in FIGS. 8A and 8B, the third magnetic substance 24a may be a sheet-shaped member that has an annular-shaped bottom surface having a predetermined width. The bottom surface of the third magnetic substance 24a may be a third attachment surface 25a in contact with the first power receiving coil 21a.

As illustrated in FIGS. 8A and 8B, the fourth magnetic substance 24b may be a sheet-shaped member that has an annular-shaped bottom surface having a predetermined width. The bottom surface of the fourth magnetic substance 24b may be a fourth attachment surface 25b in contact with the second power receiving coil 21b. Note that the outer diameter of the fourth attachment surface 25b may be set so as to be larger than the outer diameter of the third attachment surface 25a. In addition, the fourth attachment surface 25b may be arranged so as to surround the third attachment surface 25a when viewed from below.

The power receiving circuit 22 may include a first power receiving circuit 22a and a second power receiving circuit 22b. The first power receiving circuit 22a may be a power receiving circuit compatible with the electromagnetic induction method. The first power receiving circuit 22a may be connected to both end portions of the first power receiving coil 21a. In addition, after rectifying, smoothing, and converting an alternating-current electric signal transmitted to the first power receiving coil 21a into a direct-current electric signal, the first power receiving circuit 22a outputs the direct-current electric signal to the load 23.

The second power receiving circuit 22b may be connected to both end portions of the second power receiving coil 21b. In addition, the second power receiving circuit 22b is a power receiving circuit compatible with the magnetic resonance method. After rectifying, smoothing, and converting an alternating-current electric signal transmitted to the second power receiving coil 21b into a direct-current electric signal, the second power receiving circuit 22b outputs the direct-current electric signal to the load 23.

The power-receiving-side case 26 may be a substantially rectangular parallelepiped member made of a synthetic resin or the like and includes a circuit housing portion 26a, a coil housing portion 26b, and the bottom portion 26c. The circuit housing portion 26a may house the power receiving circuit 22 and the load 23. The coil housing portion 26b houses the first power receiving coil 21a, the second power receiving coil 21b, the third magnetic substance 24a, and the fourth magnetic substance 24b.

The bottom surface of the bottom portion 26c may be a plane surface that extends in a horizontal direction and is a power receiving surface 26d to be placed on the power feeding surface 16a of the power transmitting device 110. In addition, the dimensions of the first power receiving coil 21a, the second power receiving coil 21b, the third magnetic substance 24a, and the fourth magnetic substance 24b in a height direction are set so that the third attachment surface 25a of the third magnetic substance 24a and the fourth attachment surface 25b of the fourth magnetic substance 24b are located on the upper side of the power receiving surface 26d and arranged on a same plane surface parallel to the power receiving surface 26d.

A method for suppressing magnetic field coupling between the first power receiving coil 21a and the second power receiving coil 21b is a method in which the same principle as that of the method for suppressing the magnetic field coupling between the first power transmitting coil 12a and the second power transmitting coil 12b, described above, is applied to the power receiving device side. Therefore, the detailed description of the method for suppressing the magnetic field coupling between the first power receiving coil 21a and the second power receiving coil 21b will be omitted.

In the wireless power transmission system 101 of the present embodiment, the power receiving device 120 may include the first power receiving coil 21a compatible with a first transmission method, and the second power receiving coil 21b compatible with a second transmission method. Therefore, even if the power transmitting device 110 is a device compatible with any method of the two transmission methods, it is possible to transmit electric power from the power transmitting device 110 to the power receiving device 120.

Furthermore, the power receiving device 120 may include the third magnetic substance 24a placed on the first power receiving coil 21a, and the fourth magnetic substance 24b placed on the second power receiving coil 21b. Therefore, by concentrating a magnetic flux generated by the first power receiving coil 21a into the inside of the third magnetic substance 24a, it is possible to suppress the magnetic field coupling between the first power receiving coil 21a and the second power receiving coil 21b. In addition, by concentrating a magnetic flux generated by the second power receiving coil 21b into the inside of the fourth magnetic substance 24b, it is possible to suppress the magnetic field coupling between the first power receiving coil 21a and the second power receiving coil 21b.

Furthermore, the third attachment surface 25a and the fourth attachment surface 25b may be located on the upper side of the power receiving surface 26d and are arranged on a same plane surface parallel to the power receiving surface 26d. Therefore, it is possible to inhibit the magnetic flux radiated from the power transmitting coil 12 toward the first power receiving coil 21a from being blocked by the fourth magnetic substance 24b. In addition, it is possible to effectively magnetic-field-couple the power transmitting coil 12 and the first power receiving coil 21a to each other. In addition, it is possible to inhibit the magnetic flux radiated from the power transmitting coil 12 toward the second power receiving coil 21b from being blocked by the third magnetic substance 24a. In addition, it is possible to effectively magnetic-field-couple the power transmitting coil 12 and the second power receiving coil 21b to each other. As a result, it is possible to suppress a reduction of the efficiency of the transmission from the power transmitting device 110 to the power receiving device 120.

While embodiments of the present disclosure are described above, the present disclosure is not limited to the above-mentioned embodiments and may be arbitrarily modified without departing from the scope of the present invention.

In an embodiment of the present disclosure, for example, the wireless power transmission system 1 (or the wireless power transmission system 101) is allowed to be not a wireless power transmission system compatible with the electromagnetic induction method and the magnetic resonance method but a wireless power transmission system compatible with two different transmission methods of the electromagnetic induction method. In addition, the first power transmitting coil 12a may be a coil compatible with the first transmission method of the electromagnetic induction method, and the second power transmitting coil 12b may be a coil compatible with the second transmission method of the electromagnetic induction method. In addition, the first power receiving coil 21a may be a coil compatible with the first transmission method of the electromagnetic induction method, and the second power receiving coil 21b may be a coil compatible with the second transmission method of the electromagnetic induction method.

In addition, in an embodiment of the present disclosure, the wireless power transmission system 1 (or the wireless power transmission system 101) may be a wireless power transmission system compatible with two different transmission methods of the magnetic resonance method. In addition, the first power transmitting coil 12a may be a coil compatible with the first transmission method of the magnetic resonance method, and the second power transmitting coil 12b may be a coil compatible with the second transmission method of the magnetic resonance method. In addition, the first power receiving coil 21a may be a coil compatible with the first transmission method of the magnetic resonance method, and the second power receiving coil 21b may be a coil compatible with the second transmission method of the magnetic resonance method.

In addition, in an embodiment of the present disclosure, the power transmitting circuit 11 may have a configuration other than the above-mentioned configurations. For example, the first power transmitting circuit 11a and the second power transmitting circuit 11b may share a portion of a circuit. In addition, the first power transmitting circuit 11a and the second power transmitting circuit 11b are allowed to be not inverter circuits but amplifying circuits connected to oscillation circuits. In addition, in the power transmitting circuit 11, the frequency of a generated electric signal may be arbitrarily changed in accordance with the standard of a system. In addition, the power receiving circuit 22 may have a configuration other than the above-mentioned configurations.

For example, the first power receiving circuit 22a and the second power receiving circuit 22b may share a portion of a circuit. In addition, the power receiving device 20 (or the power receiving device 120) is allowed not to include the load 23, and the power receiving circuit 22 may be connected to another electronic device to serve as a load.

In addition, in an embodiment of the present disclosure, the power transmitting coil 12 or the power receiving coil 21 may be made of a material other than the above-mentioned material or have a shape other than the above-mentioned shape. For example, the number of turns in the power transmitting coil 12 or the power receiving coil 21 may be arbitrarily changed in accordance with the standard of a system. In addition, the power transmitting coil 12 or the power receiving coil 21 is allowed to be not a spiral coil wound near to the outer circumference of a circular disk but a spiral coil wound near to the outer circumference of a polygonal shape. In addition, the power transmitting coil 12 or the power receiving coil 21 is allowed to be not a spiral coil but a helical coil. In addition, the power transmitting coil 12 or the power receiving coil 21 may be a coil formed in the plate surface of a substrate, as an electrode pattern. In addition, a capacitor or the like for adjusting a resonance frequency may be added to the second power transmitting coil 12b or the second power receiving coil 21b.

In addition, in an embodiment of the present disclosure, as long as it is possible to realize a predetermined function, the direction of the power feeding surface 16a may be arbitrarily changed in accordance with the conditions of use. In addition, the power transmitting coil 12 may be housed in a different member separable from the power-transmitting-side case 15 and may be connected to the power transmitting circuit 11 through wiring lines. In addition, as long as it is possible to realize a predetermined function, the direction of the power receiving surface 26d may be arbitrarily changed in accordance with the conditions of use. In addition, the power receiving coil 21 may be housed in a different member separable from the power-receiving-side case 26 and may be connected to the power receiving circuit 22 through wiring lines.

In addition, in an embodiment of the present disclosure, the power-transmitting-side magnetic substance 13 may be made of a material other than the above-mentioned material or have a shape other than the above-mentioned shape. In a case where, for example, the first power transmitting coil 12a is a spiral coil wound near to the outer circumference of a polygonal shape, the top surface of the first magnetic substance 13a is a ring-shaped surface having the outer circumference of a polygonal shape. The same applies to the second magnetic substance 13b. In addition, the first magnetic substance 13a and the second magnetic substance 13b are each allowed not to be formed by mixing metal fine particles of a soft magnetic substance or the like into a synthetic resin and may be a plate-like member or the like obtained by sintering power of a magnetic substance such as ferrite.

In addition, in an embodiment of the present disclosure, the power transmitting device 10 (or the power transmitting device 110) may further include sensing means configured to sense a transmission method of the power receiving device 20, communication means configured to perform wireless communication with the power receiving device 20 (or the power receiving device 120), or the like. In addition, based on a sensing result of the sensing means, a result of communication with the power receiving device 20, or the like, a control circuit 14 may automatically select which transmission method of the electromagnetic induction method and the magnetic resonance method electric power transmission is performed by.

The embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A wireless power transmission system comprising:
a power transmitting device including a power transmitting coil; and
a power receiving device including a power receiving coil,
wherein using magnetic field coupling between the power transmitting coil and the power receiving coil, electric power is wirelessly transmitted from the power transmitting device to the power receiving device,
wherein the power transmitting device includes a power transmitting circuit configured to generate an electric signal used for transmitting electric power, a first power transmitting coil compatible with a first transmission method, a second power transmitting coil compatible with a second transmission method, a first magnetic substance on which the first power transmitting coil is placed, a second magnetic substance on which the second power transmitting coil is placed, and a power feeding surface on which the power receiving device is to be placed, and wherein the first magnetic substance includes a first attachment surface on which the first power transmitting coil is placed, the second magnetic substance includes a second attachment surface on which the second power transmitting coil is placed, and the first attachment surface and the second attachment surface are located on a lower side of the power feeding surface and arranged on a same plane surface parallel to the power feeding surface.

2. The wireless power transmission system according to claim 1, wherein the first power transmitting coil is a coil compatible with an electromagnetic induction method, and the second power transmitting coil is a coil compatible with a magnetic resonance method.

3. The wireless power transmission system according to claim 2, wherein a coil diameter of the second power transmitting coil is larger than a coil diameter of the first power transmitting coil, and the second power transmitting coil is arranged so as to surround the first power transmitting coil when viewed from above.

4. The wireless power transmission system according to claim 3, wherein the first attachment surface and the second attachment surface are ring-shaped surfaces each including a predetermined width, the second attachment surface is arranged so as to surround the first attachment surface when viewed from above, the first power transmitting coil is arranged so as to occupy a substantially intermediate position between an inner circumference and an outer circumference of the first attachment surface, and the second power transmitting coil is arranged so as to occupy a substantially intermediate position between an inner circumference and an outer circumference of the second attachment surface.

5. A wireless power transmission system comprising:
a power transmitting device including a power transmitting coil; and
a power receiving device including a power receiving coil, wherein using magnetic field coupling between the power transmitting coil and the power receiving coil, electric power is wirelessly transmitted from the power transmitting device to the power receiving device, wherein the power receiving device includes a first power receiving coil compatible with a first transmission method, a second power receiving coil compatible with a second transmission method, a power receiving circuit to which the first power receiving coil and the second power receiving coil are connected, a third magnetic substance placed on the first power receiving coil, a fourth magnetic substance placed on the second power receiving coil, and a power receiving surface to be placed on the power transmitting device, and wherein the third magnetic substance includes a third attachment surface in contact with the first power receiving coil, the fourth magnetic substance includes a fourth attachment surface in contact with the second power receiving coil, and the third attachment surface and the fourth attachment surface are located on an upper side of the power receiving surface and arranged on a same plane surface parallel to the power receiving surface.

* * * * *